United States Patent
Moskalenko

(10) Patent No.: US 8,098,064 B2
(45) Date of Patent: Jan. 17, 2012

(54) SPEED FILTER CALIBRATION APPARATUS AND METHOD FOR RADIO FREQUENCY METAL DETECTORS

(75) Inventor: Sergey A. Moskalenko, Maple Grove, MN (US)

(73) Assignee: Thermo Fisher Scientific, Coon Rapids, MN (US)

( * ) Notice: Subject to any disclaimer, the term of this patent is extended or adjusted under 35 U.S.C. 154(b) by 576 days.

(21) Appl. No.: 12/317,035

(22) Filed: Dec. 17, 2008

(65) Prior Publication Data

US 2010/0148761 A1    Jun. 17, 2010

(51) Int. Cl.
*G01N 27/72* (2006.01)
*G01V 3/10* (2006.01)

(52) U.S. Cl. .................. 324/228; 324/239; 324/326

(58) Field of Classification Search .............. 324/228, 324/326, 239
See application file for complete search history.

(56) References Cited

U.S. PATENT DOCUMENTS

| 5,994,897 | A | 11/1999 | King |
| 6,816,794 | B2 | 11/2004 | Alvi |
| 7,145,328 | B2 | 12/2006 | Manneschi |
| 7,432,715 | B2 | 10/2008 | Stamatescu |

*Primary Examiner* — Reena Aurora
(74) *Attorney, Agent, or Firm* — David George Johnson

(57) ABSTRACT

A metal detector (40) used for identifying contaminants in products (23) introduced into the metal detector by a conveyor. The detector (40) includes coils (1), a search head (2) and an analog to digital converter (3) that generates a reactive signal (13) in response to the presence of a contaminant in the region of the coils. A calculation processor (32) receives the reactive signal (13) along with the value of the conveyor speed (9) to determine a calibration ratio R that is unique to each individual metal detector (40). The optimum frequency F for metal detector operation is equal to the conveyor speed (9) divided by the ratio R. The ratio R simplifies the selection of filter parameters (4, 8) for a speed filter (30) which correlates the conveyor speed (9) with the frequency F so as to deliver an optimized signal to the detection algorithm (10) used to determine the presence of a contaminant based on the signal (13) derived from the coils (1).

19 Claims, 4 Drawing Sheets

SPEED FILTER CALIBRATION APPARATUS AND METHOD FOR RADIO FREQUENCY METAL DETECTORS

BACKGROUND OF THE INVENTION

1. Field of Invention

This invention pertains generally to the field of radio frequency metal detectors, and more particularly to the calibration of such a device.

2. Description of Prior Art

Metal detectors are used in the food processing industry, for example, to detect contaminants within a product. The unwanted material may include very small metallic particles having differing compositions. As seen in FIG. 3, the typical metal detector is housed in an enclosure 26 containing a longitudinal aperture 25 through which the product under test 23 is transported, usually by means of a conveyor belt, in the direction of arrow 24. The metal detector includes a radio frequency transducer or oscillator that radiates a magnetic field by means of some arrangement of coils that serve as a radio frequency antenna. An example of such a metal detector operating in the radio frequency range is disclosed in U.S. Pat. No. 5,994,897, entitled FREQUENCY OPTIMIZING METAL DETECTOR, issued on Nov. 30, 1999 to King.

The typical metal detector enclosure 26 includes both radiating and receiving coils formed to surround the aperture 25 through which the product travels. The oscillator coil is a continuous wire loop formed within the search head. The oscillator coil surrounds the aperture 25 and receives radio frequency excitation from an oscillator circuit. The enclosure 26 also includes an input coil connected to produce a zero input signal when no metal is present.

A disturbance in the radiated magnetic field is sensed by the input coil and processed in order to detect a metal contaminant within the product passing through the detector aperture. Modern digital signal processing techniques resolve the input signal into two signal components, one component being resistive and the other signal component being reactive. A nonzero input coil signal is due to either mechanical imbalances in the construction of the search head, inherent electrical changes in the circuitry such as frequency drift, metal being introduced into the aperture, or the effect of the product itself. The "product effect" caused by the product passing through the aperture is due primarily to electrical conduction via salt water within the product, the electrical conduction causing large magnitude resistive signals and relatively smaller reactive signals. An example of a metal detector using digital signal processing techniques is disclosed in U.S. Pat. No. 7,432,715, entitled METHOD AND APPARATUS FOR METAL DETECTION EMPLOYING DIGITAL SIGNAL PROCESSING, issued on Oct. 7, 2008 to Stamatescu.

Calibration of a metal detector is usually accomplished by the user of the detector. This process is dependent on operator skill and experience, and results in inconsistent results between different operators using the same machine. Examples of the complexity of the metal detection calibration process are disclosed in U.S. Pat. No. 6,816,794, entitled APPARATUS AND METHOD FOR DETECTING CONTAMINATION OF OBJECT BY A METAL, issued on Nov. 9, 2004 to Alvi, and in U.S. Pat. No. 7,145,328, entitled METAL DETECTOR AND ITS TEST PROCEDURE, issued on Dec. 5, 2006 to Manneschi.

FIG. 1 depicts a typical signal processing scheme used in a metal detector. The coils 1 are connected to the search head 2 that contains a radio frequency transmitter and receiver. When the coils 1 receive an electromagnetic signal the search head 2 divides the received signal into a reactive (X) component 11 and a purely resistive component 12. The signals 11 and 12 are in an analog form and so are forwarded to the analog to digital (A/D) converter 3 where the signal 11 is converted into a digital reactive component signal 13 and a digital resistive component signal 14.

Referring also to FIG. 2, the magnitude 16 of the reactive component signal 13 generated by the coils 1 when a metal contaminant is present in the item 23 as it moves through the aperture 25 is basically sinusoidal. As evidenced by the time axis 18, the elapsed time 21 ($T_c$) between the signal peaks 19 and 22 determines the frequency at which a particular metal detector is most sensitive to metals within the aperture 25 for a given conveyor speed. The time 21 between is dependent on the velocity of the moving item 23, the particular coil geometry and the dimensions of the aperture 25. The negative peak 22 and the positive peak 19 always occur at the same position with respect to the zero level 17 which corresponds to the geometrical center of the aperture 25. The position of the peaks 19 and 22 is dependent on a combination of coil geometry, designated by the variable $C_{nfg}$ and the case dimensions $E_{ncl}$, which together are unique to a particular model of metal detector having an aperture 25 of a particular size. In other words, the variables $C_{nfg}$ and $E_{ncl}$ are fixed for a given metal detector. Conversely, the velocity of the conveyor transporting item 23 through the aperture 25 is virtually always variable for a given metal detector due to the specific manner in which the metal detector is operated in a given environment for a particular type of item 23.

The digitized signals 13 and 14 are sent to speed filter 30, which includes a high pass filter 4 that first receives the digitized signals 13 and 14. The frequency $F_{hp}$ of the filter 4 is determined by the settings of the speed filter control 5, which calculates a control frequency $F_c$ that is a function of the variables $C_{nfg}$ and $E_{ncl}$ as well as the conveyor speed $V_c$. The high pass cut off frequency $F_{hp}$ is equal to $0.6*F_c$. The filtered signals 27 and 28 are then processed by the signal processing algorithm 7, the resultant processed signal 29 being further filtered by a low pass filter 8. The output of the low pass filter 8 is sent to a detection algorithm 10 which ultimately determines whether or not a contaminant is present within the processed item.

The frequency $F_{LP}$ of the filter 8 is controlled by signal path 31 from the speed filter control 5, which causes the value of $F_{LP}$ to be $1.2*F_c$. The appropriate value of $F_c$ is calculated by the contaminant frequency learning step 6. In practice, the user of the metal detector performs the learning step 6 at the customer location. The learning step 6 begins by passing a sample metal contaminant through aperture 25 at the conveyor line working speed without knowing the conveyor speed $V_c$. The reactive signal 13 is sampled during the learning procedure 6. If the contaminant passes through the aperture 25 at a linear speed the signal 13 is perceived as a substantially ideal sine wave and the value of $F_c$ can be measured.

Once the value of $F_c$ is determined at step 6, the speed filter control 5 associates the $F_c$ value with whatever value of $V_c$ was entered on the metal detector menu screen. If the speed of the conveyor varies, the speed filter control 5 compensates by adjusting $F_c$ and thereby shifting the combined band pass of the high and low pass filters 4 and 8, respectively, to reflect the change in conveyor speed while still maintaining maximum metal detector sensitivity.

There are numerous disadvantages to the metal calibration method just described. First, there is no method of ensuring that the value for the conveyor speed entered by the operator on the metal detector menu is accurate. Second, many operators find the foregoing calibration procedure to be confusing or overly technical. In general, the operator of the metal detector does not have a clear understanding of the concept and function of the speed filter control 5. This lack of understanding leads to misuse of the speed filter control and necessarily to a reduction in metal detector sensitivity due to improper settings of the metal detector system. A need therefore exists to employ a method of metal detector calibration which does not require the machine operator to deal with the concept of a speed filter control frequency, and which permits substantially all calibration of the metal detector to be performed at the factory prior to use by the customer.

SUMMARY OF THE INVENTION

The current invention relates to improvements in the calibration of a metal detector and includes techniques for permitting the use of single initial calibration procedure which can be performed for each particular metal detector at the manufacturing facility. One embodiment of the present invention defines a parameter that relates the speed of the product under test with the center frequency of the pass band of the speed filter. The parameter allows the elimination of the variables $C_{nfg}$ and $E_{ncl}$ by absorbing them into a single parameter that characterizes each individual metal detector. The parameter remains constant and requires only a single learning process which is performed upon completion of assembly of each detector before it leaves the factory.

DETAILED DESCRIPTION OF THE PREFERRED EMBODIMENTS

Figure 1:
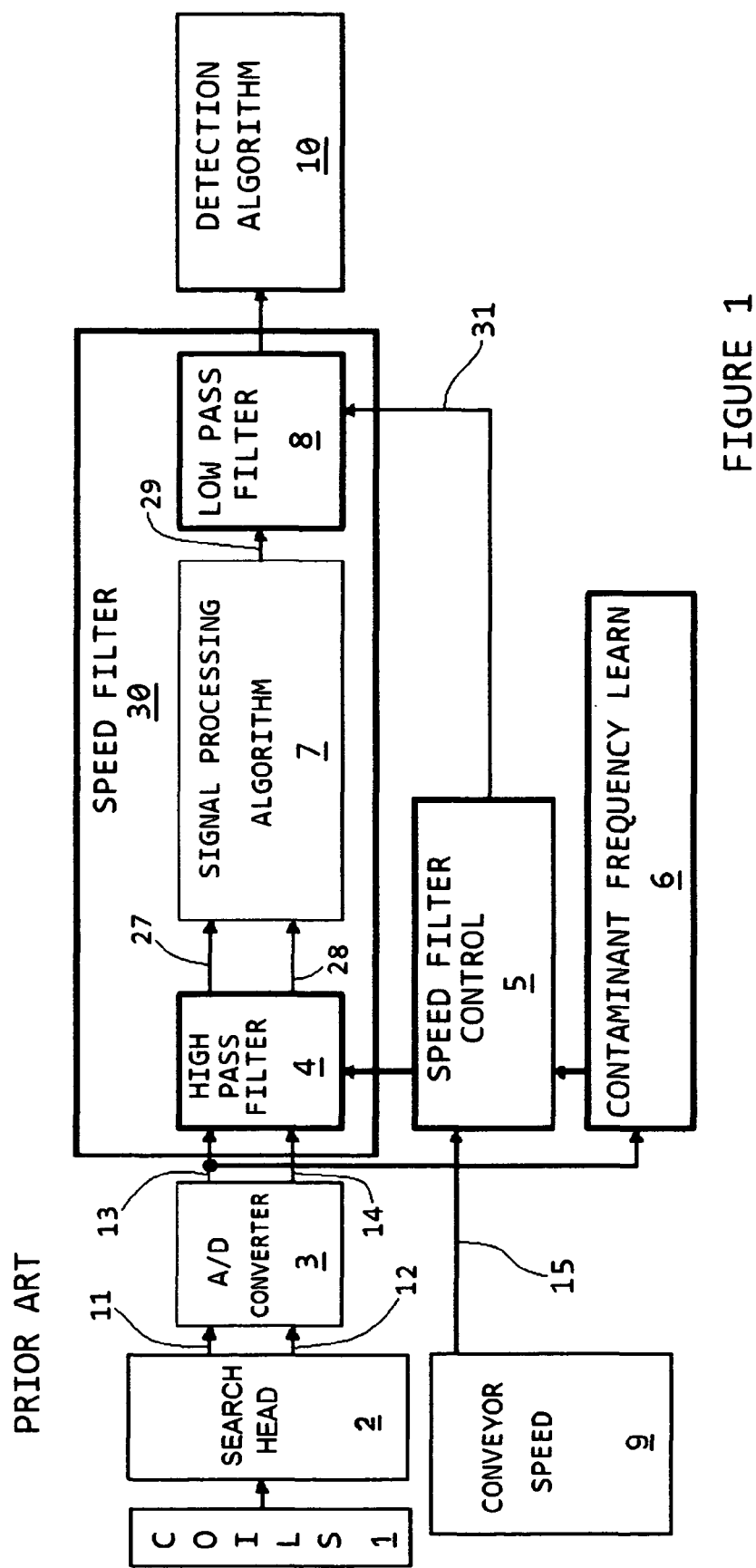
FIG. 1 is a block diagram of the prior art signal processing scheme of a metal detector.
Figure 3:
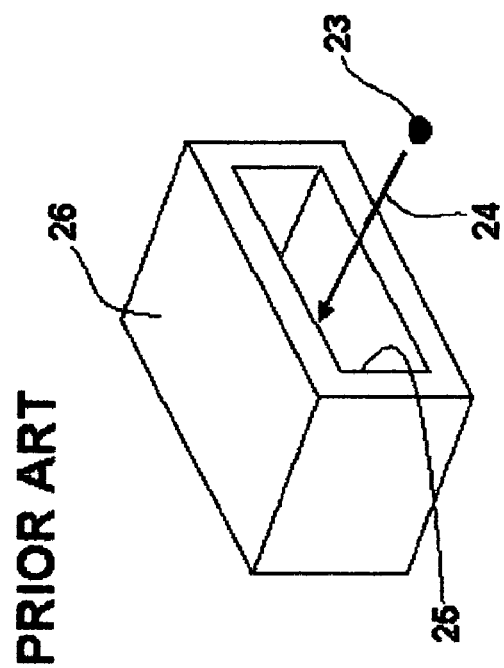
FIG. 3 is a perspective view of an enclosure and aperture arrangement used in the metal detector depicted in FIG. 1.
Figure 2:
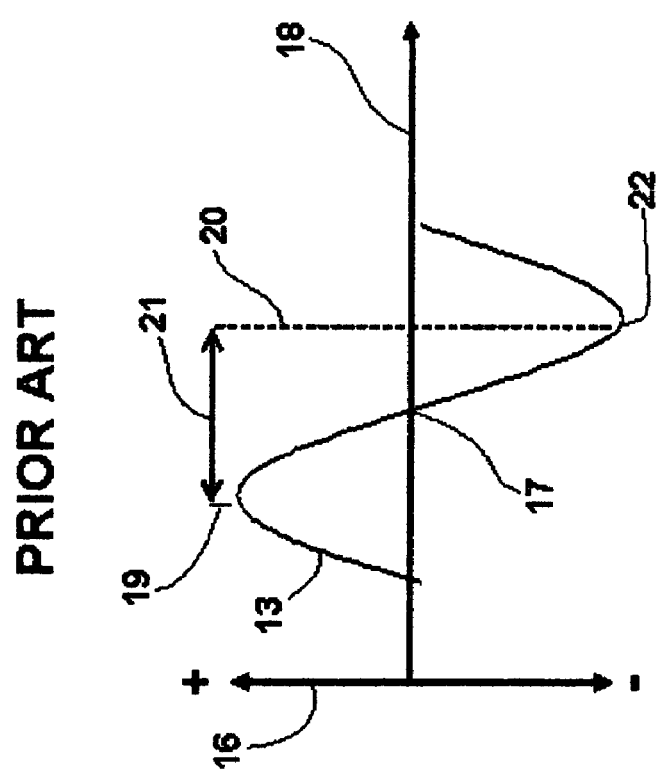
FIG. 2 is a graph depicting the reactive component of a signal generated and processed by the prior are signal processing scheme depicted in FIG. 1.
Figure 4:
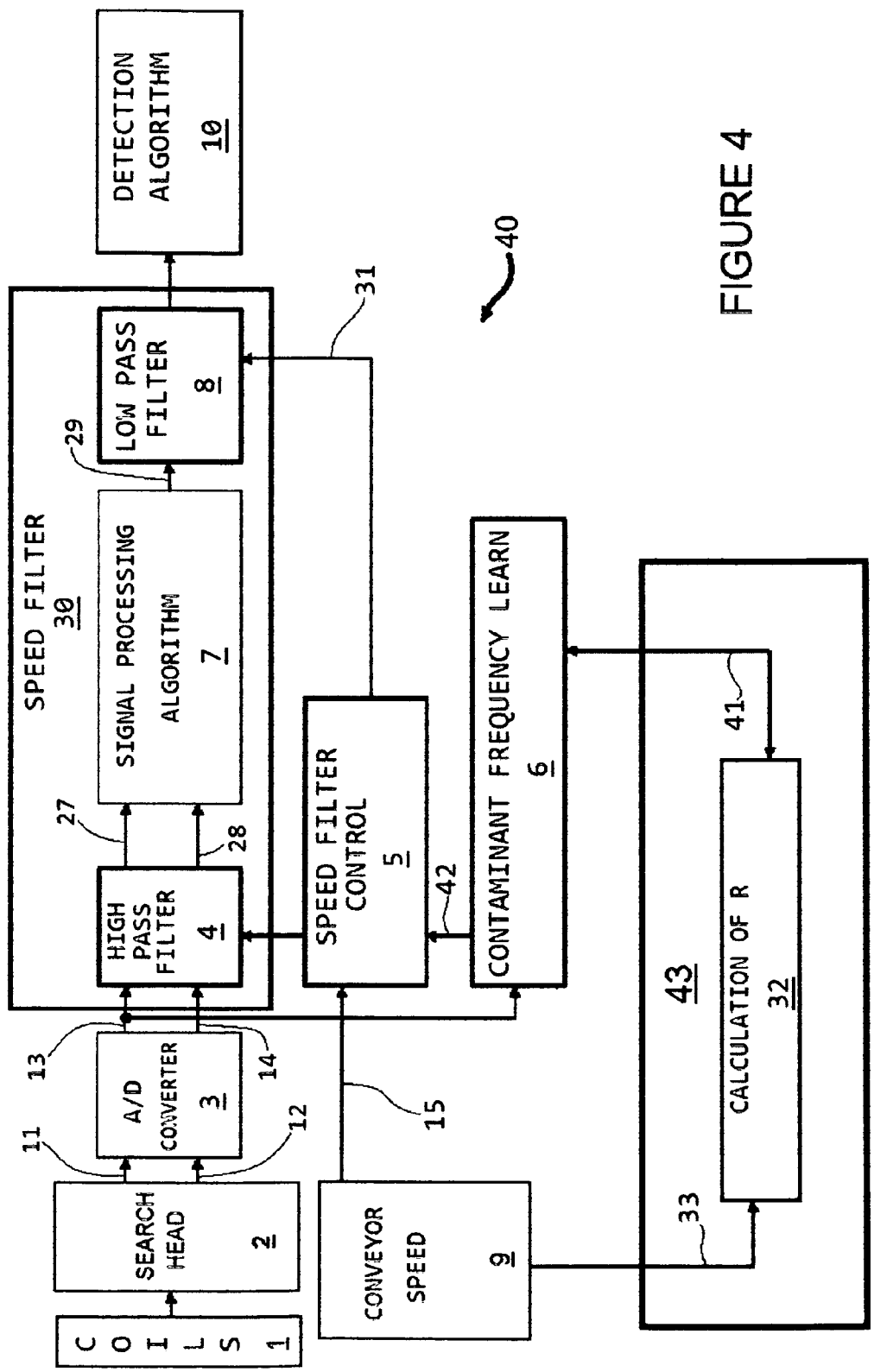
FIG. 4 is a block diagram of the metal detector signal processing protocol of the present invention.

Referring to FIG. 4, a block diagram of a metal detector constructed according to the principles of the present invention is shown generally at 40. The metal detector 40 includes the capability to measure the conveyor speed 9 which is substantially equal to the speed of any article being introduced into the region of the detector coils 1. The metal detector 40 includes a speed filter 30, which contains a signal processing hardware or software that provides the necessary information to a detection algorithm 10 that is capable of determining the presence or absence of a contaminant such as metal.

The speed filter 30 receives data from a speed filter control 5 which provides a correction or adjustment to the signal processing algorithm 7 according to the value of certain variables such as the conveyor speed 9. The speed filter 30 also receives data derived from the search head output signal 11, thereby providing a basis for the speed filter to correlate the frequency response of the search head with the conveyor speed 9.

For each conveyor speed 9, an optimum frequency exists at which the signal processing algorithm best detects the presence of a contaminant within the region of the coils 1. In order to determine the optimum frequency, contaminant frequencies learn processor 6 receives the signal 13 that is derived from the data produced by the search head 2. The optimum frequency is also a function of other constant parameters including the physical configuration of the coils 1 and the physical dimensions of the case housing the metal detector 40. The conveyor speed 9 is a variable that is dependent on the nature of the specific type of product being introduced into the region of the coils 1. In order to correlate the variable conveyor speed 9 with the constant parameters of coil configuration and physical metal detector housing dimensions, a conveyor velocity dependent ratio R that is a unique constant characterizing each individual metal detector 40 is calculated by a filter calibrator 43 which includes a processor 32. The processor 32 receives the instantaneous conveyor speed value 33 derived from the conveyor speed 9, the resultant value 41 that is calculated by the processor 32 being forwarded to the contaminant frequencies learn processor 6.

Figure 5:
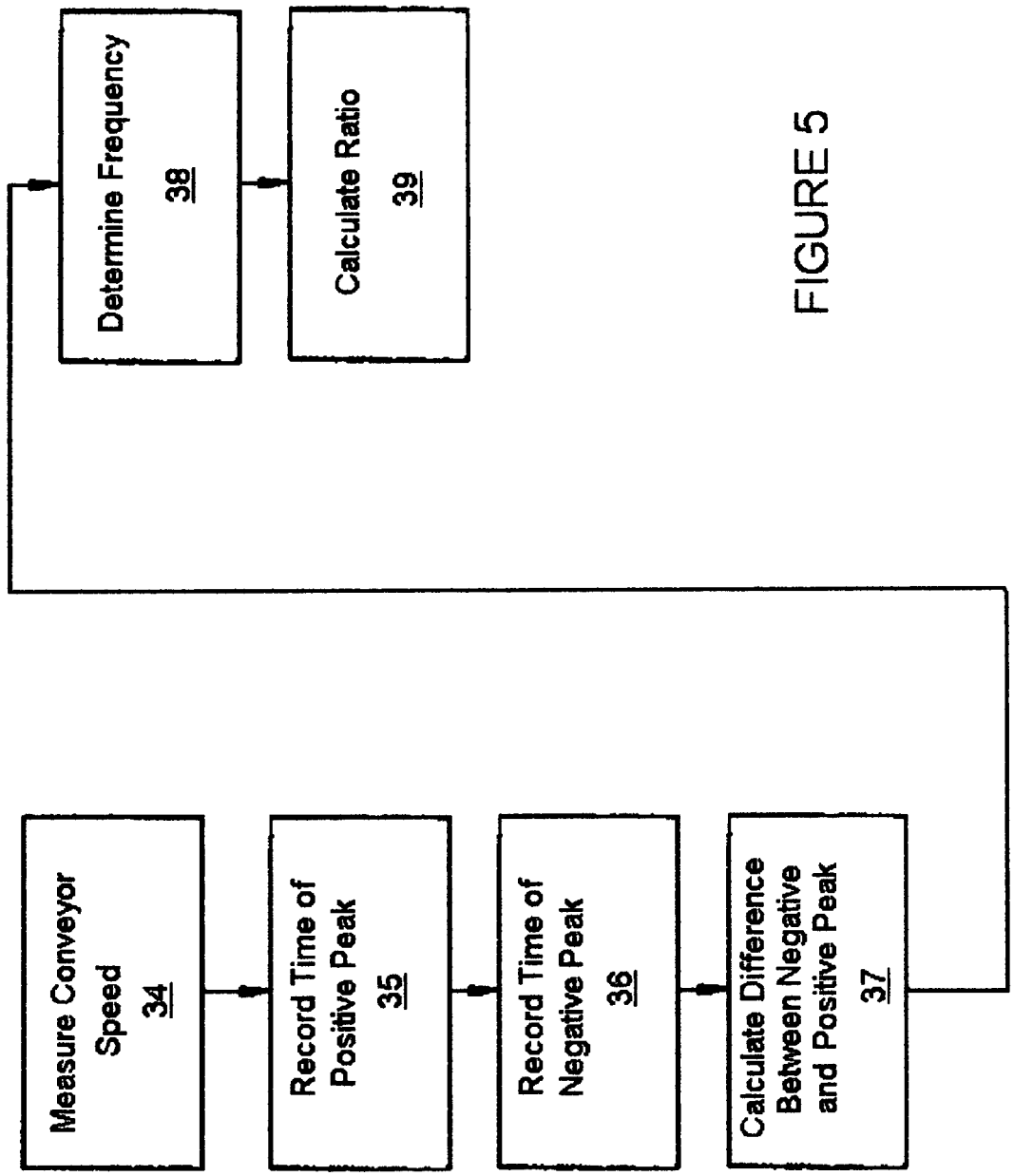
FIG. 5 is a flow chart depicting the calculation of the calibration coefficient as depicted in FIG. 4.

Referring also to FIG. 5, the steps performed by the processor 32 in performing the calculation of the ratio R begins with the step 34 which measures the conveyor speed 9 as received along signal path 33. The next operation 35 is to record the time of the positive peak 19 of the optimal waveform 13 as received via the contaminant frequencies learn processor 6 which has identified the particular frequency at which the positive peak is at maximum amplitude. Step 36 follows by recording the time of the negative waveform peak 22 of the optimal waveform identified by learn processor 6, which is also forwarded to the processor 32 from the learn processor 6. At step 37 the processor 32 calculates the time span 21 which is the absolute value of the difference between the occurrence of the positive peak 19 and negative peak 22 of the optimal waveform selected by the learn processor 6. The value of the time span 21 represents half the period of the waveform 13, and so the frequency of the waveform may be calculated at step 38 according to the formula $F=1/P$, where F is the frequency of the waveform and P is the period of the waveform. Once the frequency is known, the ratio R is calculated at step 39 according to the formula $R=V/F$, where V is the conveyor velocity 9 and F is the frequency of maximum metal detector sensitivity calculated at step 38.

The value of F is therefore equal in every case to V/R and R is unchanging for a given metal detector 40. Once calculated, the value of R is forwarded to the speed control filter 5 via signal path 42. The speed filter 5 is then able thereafter to determine the optimum value of F only with reference to the signal 15 which is indicative of conveyor speed 9. In other words, the calculation processor 32 and the contaminant frequencies learn processor 6 need only perform the calculation and forwarding of the value of R once during the life of the metal detector 40, a task which can be performed at the factory at the time of manufacture in a controlled environment and without the need to burden the actual customer or metal detector operator.

The foregoing improvements embodied in the present invention are by way of example only. Those skilled in the metal detecting field will appreciate that the foregoing features may be modified as appropriate for various specific applications without departing from the scope of the claims.

I claim:

1. A metal detector, comprising:
    (a) at least one coil residing within an electromagnetic field, the coil generating a signal in response to a disturbance of the electromagnetic field;

(b) a conveyor, the conveyor transporting a product through a region intersecting the electromagnetic field at a conveyor velocity;

(c) a filter, the filter being adapted to receive the signal and to alter a characteristic of the signal;

(d) a filter control, the filter control being interconnected to the filter, the filter control being adapted to modify a characteristic of the filter; and (e) a filter calibrator, the filter calibrator being adapted to determine an inherent parameter of the metal detector so as to permit the filter control to optimize operation of the filter by referring to a relationship between the conveyor velocity and the inherent parameter.

2. The metal detector according to claim 1, wherein the characteristic of the signal altered by the filter is a relative frequency content of the signal.

3. The metal detector according to claim 2, wherein the characteristic of the filter modified by the filter control is a bandpass characteristic of the filter.

4. The metal detector according to claim 3, wherein the filter calibrator further comprises calibrator processor, the calibrator processor further comprising:

(a) a first input, the first input being adapted to receive the conveyor speed;

(b) a second input, the second input being adapted to receive an optimal signal derived from the signal generated by the coil; and (c) a first output, the first output being the inherent parameter of the metal detector.

5. The metal detector according to claim 4, wherein the inherent parameter of the metal detector is a unique constant that characterizes an individual metal detector.

6. The metal detector according to claim 5, wherein the inherent parameter of the metal detector is a ratio between the conveyor velocity and the optimal signal derived from the signal generated by the coil.

7. The metal detector according to claim 6, wherein the fitter control further comprises a filter control processor including;

(a) a first input adapted to receive data corresponding to the conveyor velocity;

(b) a second input adapted to receive a value corresponding to the ratio representing the inherent parameter of the metal detector; and (c) a first output, the first output being an optimum frequency value for the conveyor velocity received at the first input.

8. The metal detector of claim 7, wherein the conveyor velocity is variable.

9. The metal detector of claim 8, wherein the ratio representing the inherent parameter of the metal detector is a constant having a value that is independent of the conveyor velocity.

10. The metal detector of claim 9, wherein the calculation of the inherent parameter of the metal detector is required only once per life of the metal detector.

11. A metal detector providing substantially permanent speed filter calibration, comprising:

(a) transmitting and receiving coils capable of generating and detecting an electromagnetic field, respectively;

(b) a search head housing the transmitting and receiving coils in a fixed configuration;

(c) an analog to digital converter interconnected to the search head for converting analog signals generated in response to a disturbance of the electromagnetic field into digital signals;

(d) a conveyor, the conveyor transporting a product undergoing inspection through the electromagnetic field at a velocity;

(e) a speed fitter, the speed filter being electrically interconnected to the analog to digital converter, the speed filter passing a relatively narrow band of frequencies of digital signals generated by the analog to digital converter to a detection processor;

(f) a speed fitter control, the speed filter control adjusting an optimal center frequency used by the speed filter to establish the relatively narrow band of frequencies passed by the speed filter; and (g) a calibration processor, the calibration processor generating a constant parameter uniquely associated with the metal detector, the constant parameter being forwarded to the speed fitter control, the constant parameter being used by the speed filter control in substantially all subsequent calculations relating to a determination of the optimal center frequency used by the speed filter.

12. The metal detector of claim 11, wherein the calibration processor further comprises:

(a) a first input, the first input being adapted to receive data related to the velocity of the conveyor;

(b) a second input, the second input being adapted to receive data related to a previously determined optimal center frequency; and (c) a calculator, the calculator being adapted to process the data related to the velocity of the conveyor and the previously determined optimal frequency to create the constant parameter; and (d) a first output, the first output being interconnected to the speed filter control so as to permit the speed fitter control to utilize the constant parameter in substantially all subsequent determinations of optimal center frequency made by the speed filter control.

13. The metal detector of claim 12, wherein the constant parameter calculated by the calibration processor is determined according to the formula R=V/F, where:

R is the constant parameter,

V is the velocity of the conveyor, and

F is the optimal center frequency associated with the velocity of the conveyor.

14. The metal detector of claim 13, wherein the speed filter control varies the optimum center frequency in response to a single variable.

15. The metal detector of claim 14, wherein the single variable processed by the speed filter control is the velocity of the conveyor.

16. The metal detector of claim 15, wherein the calculation of the constant parameter calculated by the calibration processor is valid for substantially all subsequent operations of the metal detector.

17. A method of calibrating a speed fitter used in a particular metal detector, comprising the steps of:

(a) radiating an electromagnetic field into an aperture of the metal detector;

(b) receiving the electromagnetic field, thereby producing a received signal;

(c) introducing a product into the aperture while the electromagnetic field is present within the aperture by means of a conveyor, the product transported through the aperture at a conveyor speed;

(d) forwarding the received signal to the speed fitter;

(e) calculating an inherent constant characteristic of the particular metal detector that is unique to the particular metal detector, according to the formula R=V/F, where:

R is the inherent constant characteristic of the particular metal detector,

V is the velocity of the conveyor, and

F is an optimal center frequency associated with the velocity of the conveyor; and (f) altering a band pass characteristic of the speed fitter in response to the inherent characteristic of the particular metal detector.

18. The method of claim 17, further comprising the step of altering the bandpass characteristic of the speed filter only in response to the velocity of the conveyor and the inherent characteristic of the particular metal detector.

19. The method of claim 18, further comprising the step of determining the inherent characteristic of the particular metal detector only once during a life span of the particular metal detector.

* * * * *